United States Patent [19]
Ito

[11] Patent Number: 5,451,976
[45] Date of Patent: Sep. 19, 1995

[54] IMAGE DISPLAY APPARATUS

[75] Inventor: Ryo Ito, Tokyo, Japan

[73] Assignee: Sony Corporation, Japan

[21] Appl. No.: 305,130

[22] Filed: Sep. 13, 1994

[30] Foreign Application Priority Data

Sep. 14, 1993 [JP] Japan .................. 5-228400

[51] Int. Cl.6 ............................ G09G 3/00
[52] U.S. Cl. .................................... 345/8
[58] Field of Search ............... 345/7, 8; 348/53; 359/630–633, 466, 476

[56] References Cited

U.S. PATENT DOCUMENTS

| | | |
|---|---|---|
| 3,216,778 | 11/1965 | Davies et al. . |
| 3,787,109 | 1/1974 | Vizenor . |
| 3,923,370 | 12/1975 | Mostrom . |
| 4,034,401 | 7/1977 | Mann . |
| 4,081,209 | 3/1978 | Heller et al. . |
| 4,153,913 | 5/1979 | Swift . |
| 4,257,062 | 3/1981 | Meredith . |
| 4,310,849 | 1/1982 | Glass . |
| 4,516,157 | 5/1985 | Campbell . |
| 4,559,555 | 12/1985 | Schoolman . |
| 4,636,866 | 1/1987 | Hattori . |
| 4,706,117 | 11/1987 | Schoolman . |
| 4,751,691 | 6/1988 | Perera . |
| 4,753,514 | 6/1988 | Kubik . |
| 4,805,988 | 2/1989 | Dones . |
| 4,806,011 | 2/1989 | Bettinger . |
| 4,830,464 | 5/1989 | Cheysson et al. . |
| 4,853,764 | 8/1989 | Sutter . |
| 4,874,235 | 10/1989 | Webster . |
| 4,933,755 | 6/1990 | Dahl et al. . |
| 4,952,024 | 8/1990 | Gale . |
| 4,984,179 | 1/1991 | Waldern . |
| 4,994,794 | 2/1991 | Price et al. . |
| 5,003,300 | 3/1991 | Wells . |
| 5,034,809 | 7/1991 | Katoh . |
| 5,097,252 | 3/1992 | Harvill et al. . |
| 5,129,716 | 7/1992 | Holakovszky et al. . |
| 5,162,828 | 11/1992 | Furness et al. . |
| 5,281,957 | 1/1994 | Schoolman ............... 345/8 |
| 5,347,400 | 9/1994 | Hunter ..................... 345/8 |

FOREIGN PATENT DOCUMENTS 0473343  3/1992  European Pat. Off. ......... 345/8

Primary Examiner—Jeffery Brier
Attorney, Agent, or Firm—Pasquale Musacchio; Jerry A. Miller

[57] ABSTRACT

An image display apparatus is described for reducing the possibility of the occurrence of minor discomforts such as headaches, eyestrain, fatigue and the like in users. A symbol indicating distance such as 1m, 3m, or ∞ is displayed on an outer periphery of a virtual image adjusting knob. When the user aligns a mark on the virtual image position adjusting knob with a position corresponding to one of the predetermined symbols, the virtual image is set so as to be displayed at a position corresponding to the symbol. Consequently, the user can more easily recognize the displayed position of the virtual image so that the generation of a minor discomfort due to long term use which is more than necessary of the image display apparatus is substantially reduced.

27 Claims, 15 Drawing Sheets

IMAGE DISPLAY APPARATUS

BACKGROUND

1. Field of the Invention

The present invention relates to image display apparatus and more particularly, to an eyeglass type image display apparatus which substantially reduces or eliminates the occurrence of minor discomforts such as headaches, eyestrain and the like.

2. Background of the Invention

Game devices which provide virtual reality images are becoming increasingly popular. Typically, such devices enable a user to view a three-dimensional image on a display while playing a game. This provides a realistic effect which enhances enjoyment of playing the game.

In such devices, an eyeglass type display apparatus is utilized to display the three-dimensional image. Typically, the display apparatus is worn on a user's head and positioned in front of the user's eyes so as to enable viewing by the user. However, some users may develop headaches, eyestrain, fatigue or other minor discomforts if the display apparatus is used for a relatively long period of time.

It is therefore a principal object of the present invention to provide an image display apparatus which substantially reduces or eliminates the occurrence of such minor discomforts.

SUMMARY OF THE INVENTION

An image display apparatus which includes an image displaying device for displaying an image and an optical device for optically generating a virtual image of the image displayed through the image displaying device. The image display apparatus further includes an adjusting device for adjusting a position of the virtual image and a position displaying device for displaying a position of the virtual image.

DETAILED DESCRIPTION OF THE INVENTION

Figure 1:
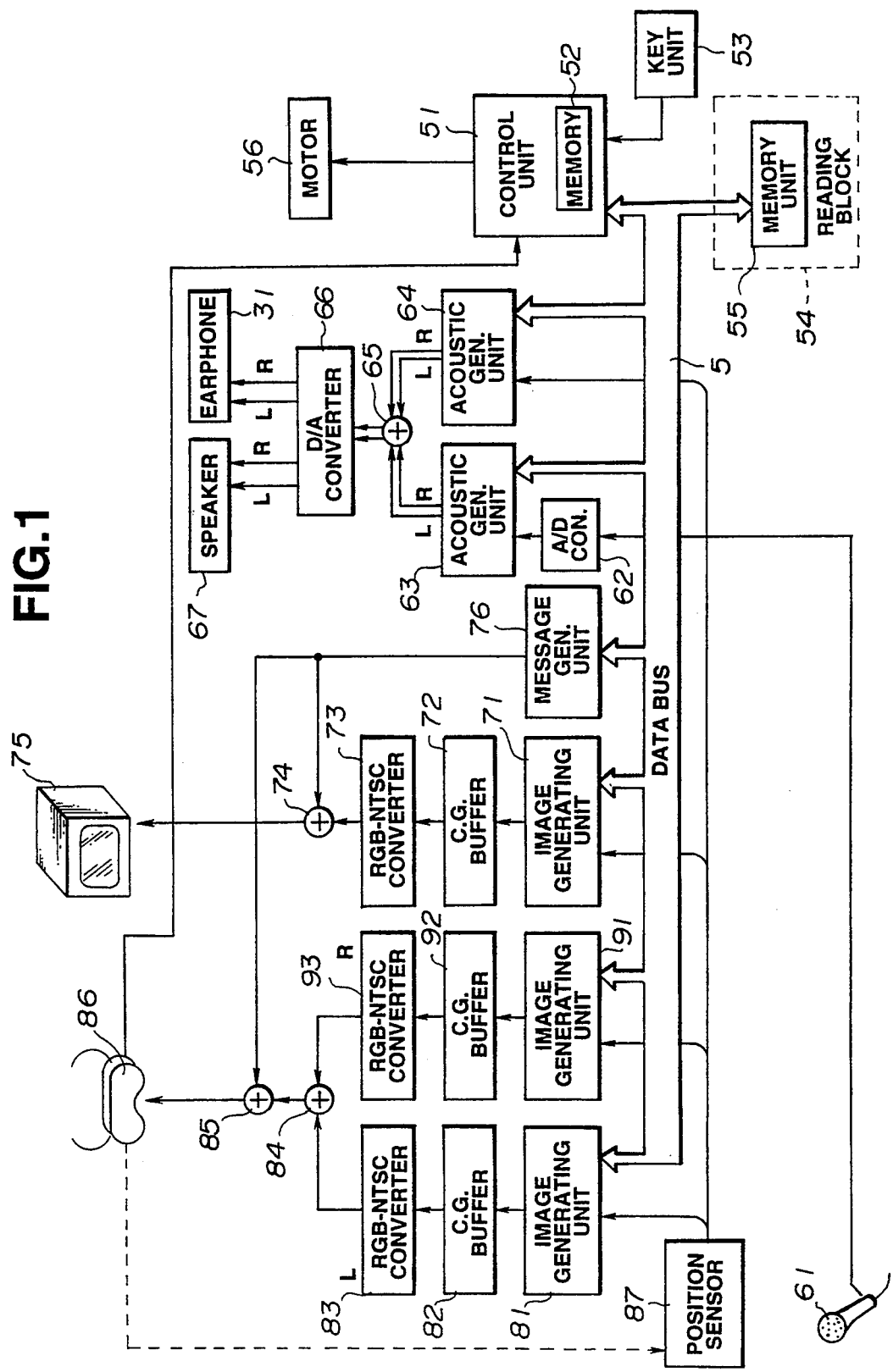
FIG. 1 is a block diagram for a preferred embodiment of an image display apparatus according to the present invention.

FIG. 1 is a block diagram representing a structure of a preferred embodiment of an image display apparatus according to the present invention. The image display apparatus includes a control unit 51 having a microcomputer which controls each block and which executes as a function of the image display apparatus. The control unit 51 includes memory 52 having a RAM or ROM in which predetermined image data on games is previously stored.

In a case where the memory 52 is constructed as RAM, predetermined data is read from CD-ROM mounted, for example, on a memory unit or reading block 54 and can be stored in the RAM. Further, in a case where the memory 52 is constructed as ROM, the ROM may be a type of card which is configured to enable replacement with an alternate card.

The reading block 54 includes a memory unit 55. Memory unit 55 comprises, for example, CD-ROM in which speech data are stored. It is noted that the speech data may also be stored in the memory 52.

The image display apparatus further includes a microphone 61 for collecting sound such as a user's voice. The collected speech signal through the microphone 61 is converted into a digital signal by means of an A/D converter 62 and is supplied to a first acoustic generating unit 63. The first acoustic generating unit 63 serves to provide the input speech data from the A/D converter 62 for an echo effect, to carry out a predetermined effect processing, and to synthesize and output the speech data supplied from the memory unit 55 via a data bus 5 with the speech data.

A second acoustic generating unit 64 carries out a predetermined effect on the speech data supplied from the memory unit 55 which is then outputted. A first synthesize circuit 65 synthesizes speaker and ear phone speech data outputted from the first acoustic generating unit 63 and the second acoustic generating unit 64, respectively. The first synthesize circuit 65 then outputs the synthesized data to a D/A converter 66. The D/A converter 66 converts the input data thereto into an analog signal. The speech data for the speaker supplied from the first acoustic generating unit 63 is supplied to a speaker 67. The speech data for the ear phone supplied from the second acoustic generating unit 64 is supplied to the ear phone 31.

The speech data supplied from the speaker 67 and ear phone 31 may be different from one another. For example, in the ear phone 31, the speech can only be output from the memory unit 55. The speech from the memory unit 55 and those input from the microphone 61 can be output.

In addition, the image display apparatus includes a first image generating unit 71 which serves to receive image data to be displayed on a monitor 75 from among the image data stored in the memory 52 via data bus 5. The first image generating unit 71 also receives position data output from a position sensor 87 which is included in an eyeglass display 86. The position sensor 87 outputs data relating to the position in a predetermined space such as a room. By way of example, the positional data generated by the position sensor 87 includes data indicating whether the head is facing leftward or rightward (direction coincident with horizontal direction), data indicating whether the head is tilted upward or downward (direction coincident with the vertical direction) and so forth.

The first image generating unit 71 selects and corrects the image data supplied from the control unit 51 corresponding to the output data of the position sensor 87. A first CG (computer-graphic) buffer 72 temporarily stores the image data supplied from the first image generating unit 71 and outputs them to a first RGB-NTSC converter 73. The first converter 73 converts the image data including the RGB data into the video signal in NTSC form and outputs the video signal to a second synthesize circuit 74.

A message generating unit 76 generates a message (characters) corresponding to a message code supplied via the data bus 5 and read from the memory of the control unit 51 and supplies it to the second synthesize circuit 74. The second synthesize circuit 74 synthesizes the image signal supplied from the first converter 73 and image signal supplied from the message generating unit 76. The synthesized output is then supplied to a monitor 75.

A second image generating unit 81 receives image data for a left eye from the data selected by a key unit 53 and from the data which is stored from the control unit 51 to the memory 52. In addition, the second image generating unit 81 receives the position data detected by the position sensor 87. The second image generating unit 81 selects and corrects the data supplied from the control unit 51 corresponding to the detected data from the position sensor 87. The correction data is supplied to the second RGB-NTSC converter 83 via the second CG buffer 82. The second converter 83 converts the RGB data to the image data in the NTSC format and supplies the converted image data to a third synthesize circuit 84.

In the same manner as the second image generating unit 81, second CG buffer 82, and the second converter 83 which process the image for the left eye, a third image generating unit 91, third CG buffer 92, and third RGB-NTSC converter 93 for a right eye are utilized. The output signal of the third converter 93 is supplied to the third synthesize circuit 84 so as to be synthesized with the data from the second converter 83. The image data output from the third synthesize circuit 84 is furthermore supplied to the fourth synthesize circuit 85 and synthesized with the image signal of the message output from the message generating unit 76 and is supplied to the eye glass display 86.

Figure 2:
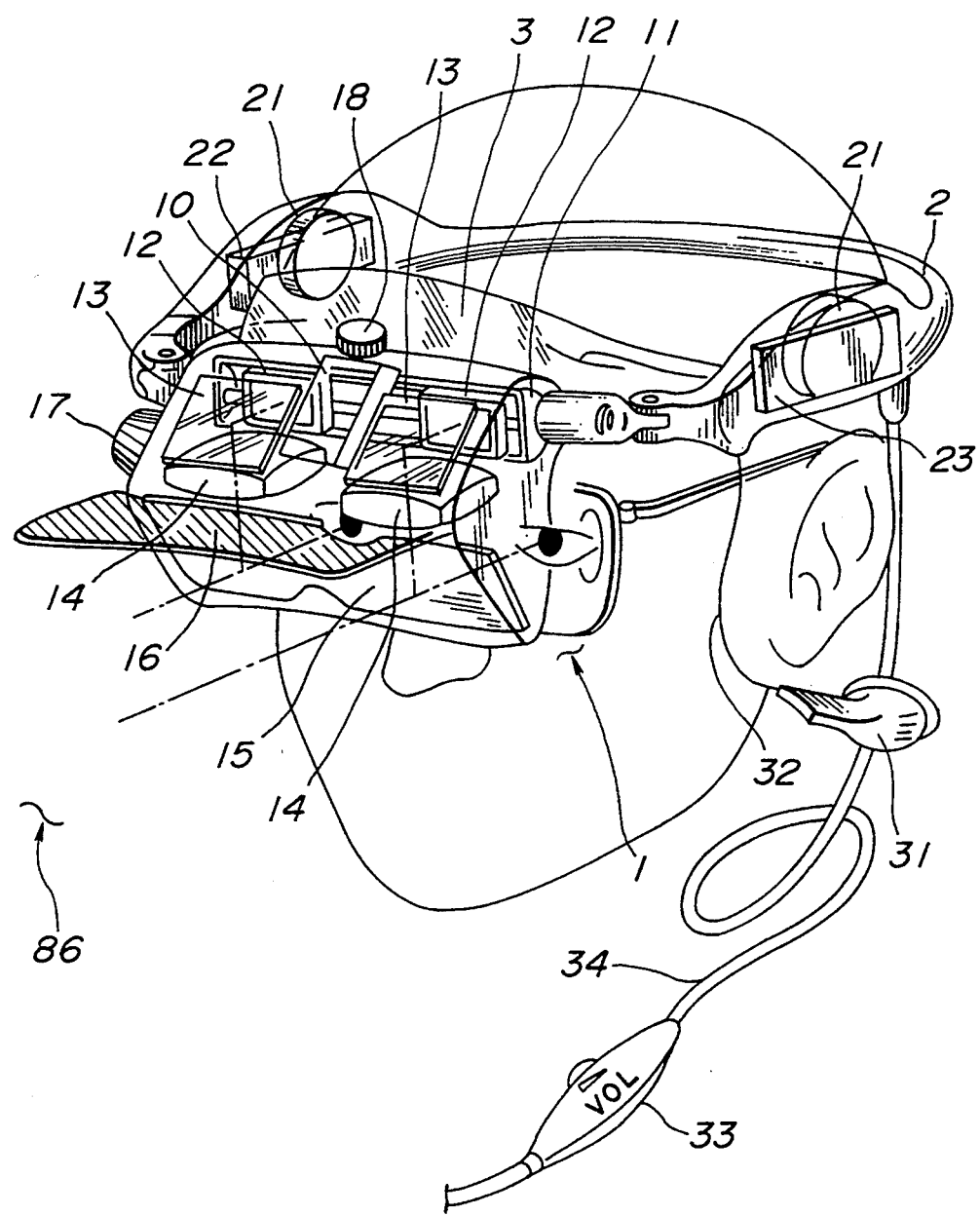
FIG. 2 is a perspective view representing a detailed structure of an eyeglass display apparatus.

FIG. 2 is a view of the eyeglass display 86 positioned on the head of a user. The eyeglass display 86 includes a main body 1 having a ring 2. The ring 2 is adapted for encircling a portion of the user's head to enable the main body 1 and ring 2 to be removeably mounted onto the user's head. The eyeglass display 86 is positioned such that the main body 1 is located toward a front portion of the user's head in front of the user's eyes and the ring 2 is turned toward a rear portion of the user's head. The eyeglass display 86 further includes a pad 3 which is affixed on an inner portion of the main body 1. The pad 3 serves to press against the user's forehead to provide support. Consequently, as if a human kind wore a pair of glasses, the user can mount the pair of glasses type display 86 on his or her ears.

A back light 11 is disposed on the main body 1. The back light serves to illuminate left and right LCDs 12. The left LCD 12 serves to display the image signal for the left eye and the right LCD 12 serves to display the image signal for the right eye. The images displayed on the left and right LCDs 12 are then reflected by left and right mirrors 13, respectively.

A half mirror 15 is then used to reflect the reflected images from the left and right mirrors 13 on the eyes of the user. In particular, the image displayed on the left LCD 12 becomes incident on the user's left eye and the image displayed on the right eye LCD 12 becomes incident on the user's right eye.

Left and right aspherical lenses 14 are interposed between the left and right mirrors 13 and the half mirror 15 so that the images displayed on the left eye's LCD 12 and right eye's LCD 12 are expanded and focused on the user's eyes for displaying virtual images.

A smoked glass element 16 is pivotally mounted on a front surface of the half mirror 15. The smoked glass element 16 may be pivoted to an open position wherein the smoked glass element 16 extends outwardly from the main body 1. Alternatively, the smoked glass element 16 may be pivoted to a closed position, wherein the glass element 16 extends downward. As shown in FIG. 2, with the smoked glass element 16 in the open position, the user can view the external field as necessary via the pair of the half mirror 15. The user can automatically select a view of the images of the LCDs 12 reflected by means of the half mirrors 15 or a view of the external field, depending on which view the user focuses on. If the user does not desire to view the external field, the image of the LCDs 12 can be more clearly viewed by pivoting the smoked glass element 16 into the closed position so that light from the external field incident on the half mirror 15 is substantially reduced.

An eye width adjusting knob 17 is disposed on the right side surface of the main body 1 relative to the user. The eye width adjusting knob 17 enables the user to adjust a distance in the horizontal direction between the left and right aspherical lenses 14 so that the distance between the left and right lenses 14 corresponds with the distance between the user's eyes.

In addition, a virtual image position adjusting knob 18 is disposed on an upper center surface of the main body 1. Rotation of the virtual image position adjusting knob 18 changes the distance between the LCDs 12 and aspherical lenses 14 in an optical axis direction. As such, the position of virtual image can be adjusted (diopter adjustment). That is to say, if the user adjusts the virtual image position adjusting knob 18, the user's eye can recognize the image displayed on the LCDs 12 as a virtual image at selected distances from the user as desired. By way of example, the user's eye can recognize the image displayed on the LCDs 12 as a virtual image 3 meters away from the user or can recognize the image as a virtual image 1 meter away from user. This distance can be adjusted by turning the virtual image position adjusting knob 18.

A D/A converter 10 is installed between the left and right mirrors 13. The D/A converter 10 outputs power for driving the back light 11. The power to drive the back light 11 is relatively high so that it becomes disadvantage from a standpoint of dielectric voltage breakdown if the D/A converter 10 is installed away from the back light 11. Hence, in the embodiment, as shown in FIG. 2, the D/A converter 10 is disposed between the left and right mirrors 13 and is adjacent to the back light 11.

Head phone reels 21 are installed on left and right side surfaces of the ring 2 so that headphone cords 32 of the left and right ear phones 31 can appropriately be wound. A D/D converter 22 is housed within the right side surface of the ring 2. The D/D converter 22 serves to supply the required DC voltage for each part of the eyeglass display 86. In addition, housed in the left side surface of the ring 2 is an RG pc board having a circuit which processes the image signals, a driver which drives an LCD 12, and other devices arranged for operating the eyeglass display 86 as will be appreciated by those of ordinary skill in the art.

A remote controller 33 is connected to a left side surface of the ring 2 relative to the user via remote controller cords 33. The user can adjust the images displayed on the LCDs 12 and the speech signal derived from the ear phone 31 by selecting desired function keys on the remote controller. It is noted that the function keys of the remote controller 33 can correspond to all or some of the function keys in the key unit 53.

The function of the key unit 53 will now be described. The user can operate a predetermined key of the key unit 53 so as to select a predetermined game from a plurality of games. When such a selection as described above is made, the image data corresponding to the selection is read from the memory 52 and are output to the first 71, second 81 and third 91 image generating units.

In addition, when a start key of a key unit 53 is operated, the reading block 54 reads the speech data corresponding to the game assigned from the memory unit 55 and is output to the first 63 and second 64 acoustic generating units.

The second acoustic generating unit 64 carries out the predetermined acoustic effect assigned to the key unit 53 on the input speech data. The speech data output from the first synthesize circuit 65 is converted as D/A conversion by means of the D/A converter 66 and is supplied to the ear phone 31. This permits the user to hear the sound on the assigned game via the ear phone 31.

In the same way, the speech data is output from the first acoustic generating unit 63 to the first synthesize circuit 65. The speech data for the speaker output from the first synthesize circuit 65 is converted as the D/A conversion into the analog signal and, thereafter, is supplied to the speaker 67 so as to produce the acoustic sound signal. Consequently, the sound of the game is output from the speaker 67 fixed on a predetermined position of the room (space) in which the game apparatus is disposed. A person other than the user of the eyeglass display 86 is able to hear the sound derived from the speaker 67.

On the other hand, the second 81 and third 91 image generating units process the image data for the left eye and the right eye, respectively, supplied from the control unit 51 and output them to the second 83 and third 93 converters via the second 82 and third 92 CG buffers. After the image signals converted from the RGB data to those in the NTSC format by means of the second 83 and third 93 converters are synthesized by means of the third synthesize circuit 84, the image signals are supplied to the eyeglass display 86 via the fourth synthesize circuit 85. In addition, at this time, the image signals of the message generated by the message generating unit 76 are synthesized with the image signals from the third synthesize circuit 84 as necessary and are supplied to the eyeglass display 86. Consequently, the images and messages are displayed on the LCDs 12 of the eyeglass display 86.

At this time, the LCD 12 for the left eye displays the images for the left eye processed by the second image generating unit 81, the second CG buffer 82, and the second converter 83. The LCD 12 for the right eye displays the images processed by the third image generating unit 91, the third CG buffer 92, and third converter 93. The images displayed on the LCDs 12 illuminated on the back light 11 are incident on the respective left and right eyes of the user independently from the pair of mirrors 13, the aspherical lenses 14, and half mirrors 15. The images for the left eye and for the right eye include components corresponding to a parallax. As the result, the user synthesizes the virtual image incident on both eyes in his or her mind and recognizes it as a solid image.

It is noted that in a case where it is not necessary to make the solid image, one of each pair of the second 81 and third 91 image generating units, the second 82 and third 92 CG buffer, and the second 83 and third 93 converters become unnecessary.

In this way, the LCDs 12 display one of the images of the games selected by the user.

On the other hand, the first image generating unit 71 supplies the image data for display on the monitor 75 from the control unit 51. In addition, the image data are supplied to the first converter 73 via the first CG buffer 72 and are converted into the image signals in the NTSC format. Thereafter, the second synthesize circuit 74 synthesizes the image signal of the message output from the message generating unit 76 as necessary. Then, the output signal of the second synthesize circuit 74 is supplied to the monitor 75 and is displayed thereon.

People other than those utilizing the eyeglass display 86 are able to view the images displayed on the monitor 75. In addition, it is noted that the user can observe the surrounding situation in addition to the monitor 75 via the half mirrors 15 with the smoke glass element 16 in the open position.

The images displayed on the monitor 75 may be the same as those displayed on eyeglass display 86, or alternatively, may be the images may be different from those described above. For example, the eyeglass display 86 displays the images of the games. On the other hand, the monitor 75 can display the image of the user who is playing the game. In this case, for example, a television camera photographs the user and the image signal thus obtained can be superposed on the image displayed on the monitor 75.

On the other hand, when the user speaks at a predetermined time, the speech is collected through the microphone 61 and the collected microphone signal is converted into the digital signal by means of the A/D converter 62. After the A/D conversion is carried out, the A/D converted digital signal is carried out by means of the first acoustic generating unit 63. The first acoustic generating unit 63 synthesizes the voice of the memory unit 55 with respect to the input vocal data by providing the predetermined echo effect according as required. Then, the sound synthesized data is supplied to the speaker 67 via the first synthesize circuit 65 and D/A converter 66.

The position sensor 87 is mounted on the eyeglass display 86. The position sensor 87 outputs the position data of the user as previously described. The position data is then supplied to the second 81 and third 91 image generating units. The second 81 and third 91 image generating units select and correct the image data supplied from the control unit 51. Consequently, the LCDs 12 display the images corresponding to the position of the user. In particular, if the user's head moves upward, downward, leftward, and rightward, the displayed images are changed to those of the upward, downward, leftward, and rightward positions, respectively.

Figure 3:
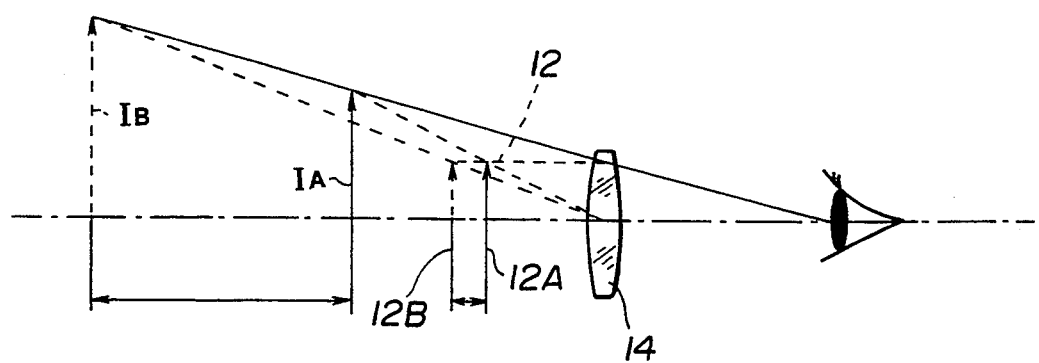
FIG. 3 depicts a theory of operation for changing the displayed position of a virtual image by movement of LCDs.

FIG. 3 shows a principle of operation when the virtual image position adjusting knob 18 is rotated to adjust the position of the virtual image.

As shown in FIG. 3, suppose that the LCDs 12 are positioned at a position 12A to the left of the aspherical lenses 14. The user can view a virtual image IA located at a position to the left of position 12A since the image displayed on the LCDs 12 is viewed via the aspherical lenses 14.

In this state, suppose, for example, that the LCDs 12 are moved to a position 12B to the left of position 12A far away from position 12A. The user consequently views the virtual image IB to the left of virtual image IA at a position far away from position 12B. That is to say, when the user adjusts the virtual image position adjusting knob 18, the position of the LCDs with respect to the aspherical lenses 14 is adjusted according to the adjustment of the knob so that the position of the virtual image is changed.

Figure 4:
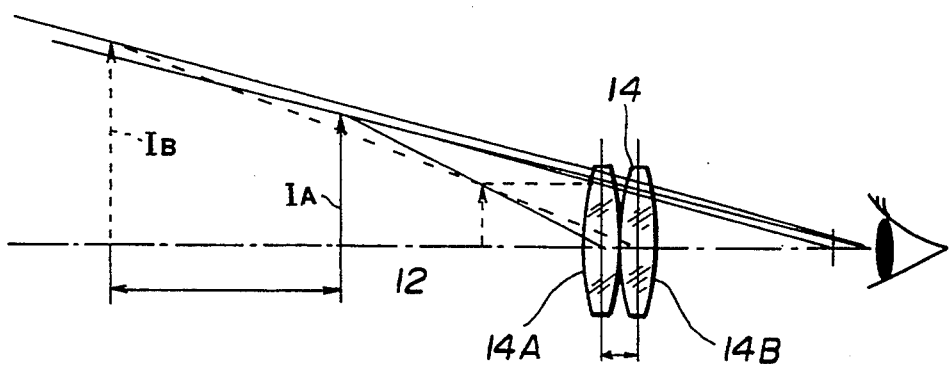
FIG. 4 depicts a theory of operation for changing the displayed position of the virtual image by movement of aspherical lenses.

Alternatively, for example, as shown in FIG. 4, with the LCDs 12 fixed at a predetermined position, the position of the aspherical lenses 14 is adjusted with respect to the LCDs 12 so that the position of the virtual image can be changed. That is to say, if the aspherical lenses 14 are placed at a position 14A to the right of LCDs 12, the user consequently views the virtual image IA located to the left of LCDs 12. On the contrary, when the aspherical lenses 14 are moved to the right of position 14A to a position 14B which is far away from the LCDs 12, the user can view the virtual image IB located to the left of virtual image IA at a position far away from the position 14B.

As shown in FIGS. 3 and 4, when a relative distance between those of the aspherical lens 14 and LCDs 12 is varied, the position of the virtual image is changed. The change in the virtual image is equivalent to the change in the magnitude of the virtual image. Consequently, what is adjusted by adjusting the virtual image position knob 18 can mean the magnitude of the virtual image (magnitude of the image screen to which the virtual image corresponds).

Figure 5A:
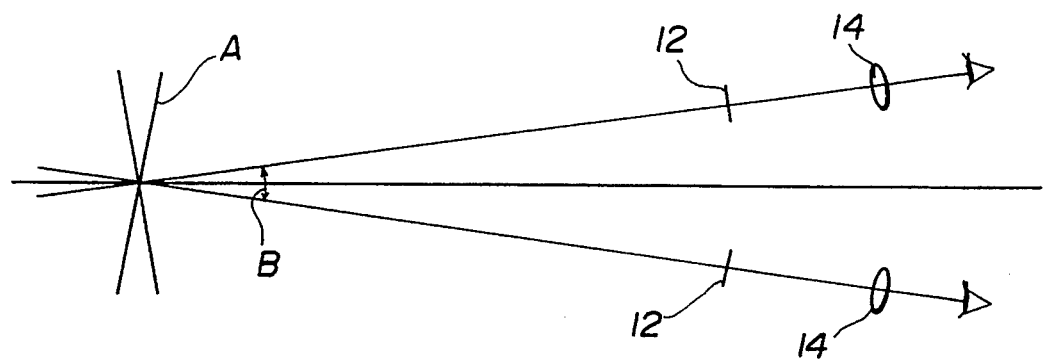
FIGS. 5 (a) and (b) depict the relationship between a displayed position of the virtual image and convergence angle.
Figure 5B:
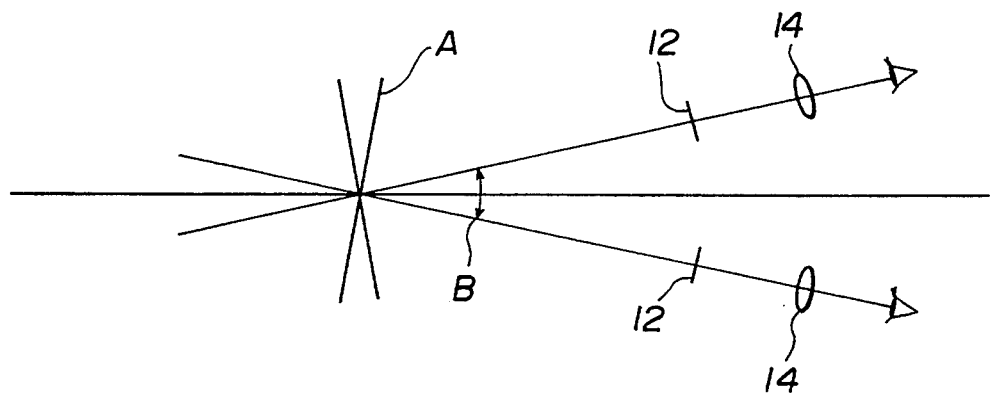

In this way, when the relative distance between the LCDs 12 and aspherical lenses 14 is changed, the position of the virtual image (magnitude of the image screen) can also be modified. However, if the position of the virtual image is changed, a direction of the LCDs 12 (i.e. convergence angle) needs to be slightly changed. That is to say, as shown in FIG. 5 (a) in which a displayed position of the virtual image A is far away, an angle B between a line extending from each center of the left and right LCDs 12 (a center between the left and right eyes) to the virtual image A (i.e convergence angle) is narrow. However, as shown in FIG. 5 (b) in which the displayed position of the virtual image A comes closer to the LCDs 12, the convergence angle B becomes wider. Therefore, if the displayed position of the virtual image A comes closer, it is desirable for the LCDs 12 to be disposed toward a more inner position as compared with the case wherein the displayed position of the virtual image A is far away. In this way, the user can observe the virtual image A correctly even if the displayed position of the virtual image is far or near.

Figure 6:
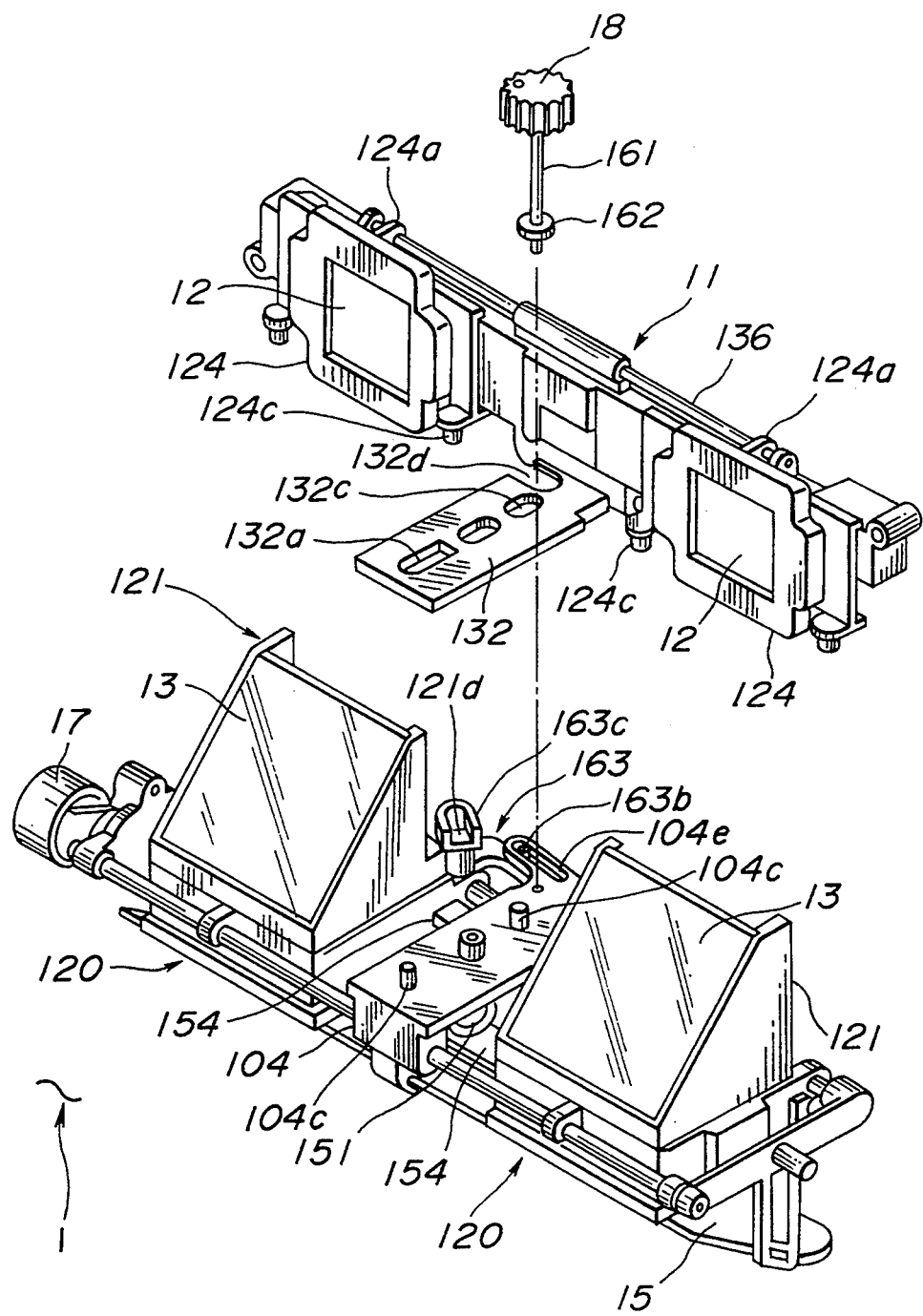
FIG. 6 is a perspective view representing an example of a partial structure for changing the displayed position of a virtual image.
Figure 7:
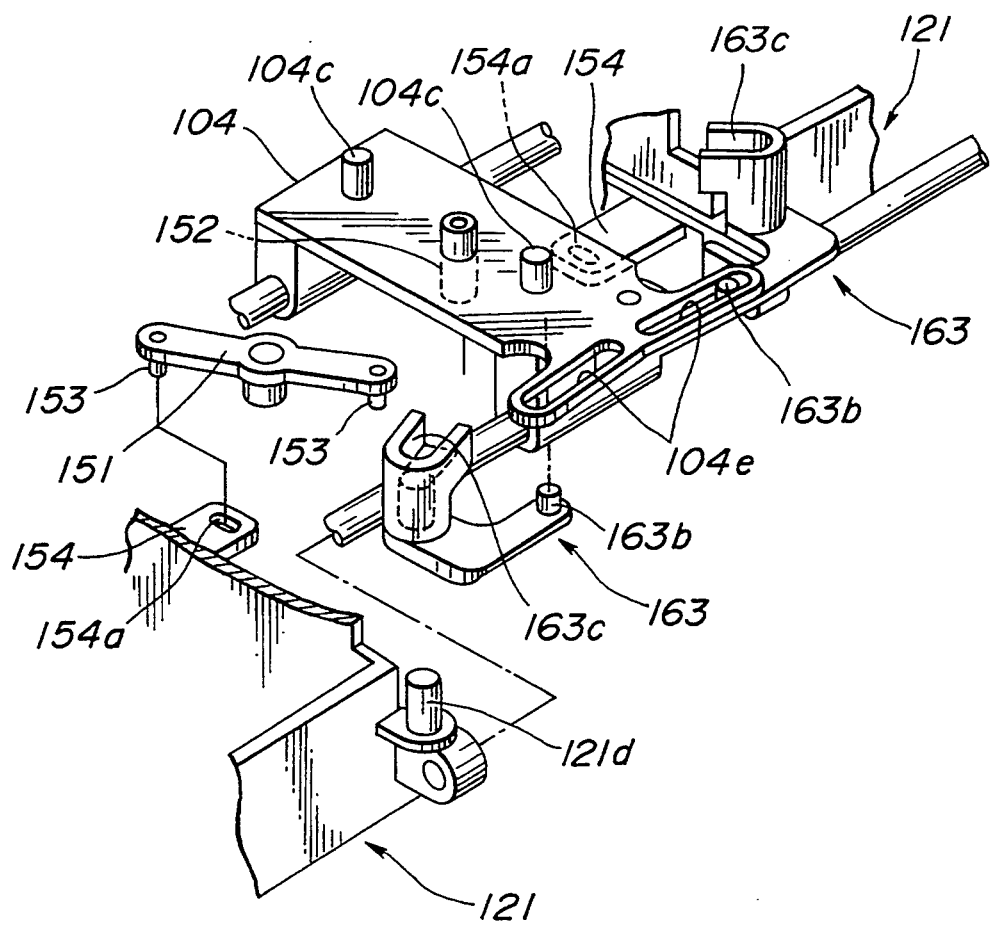
FIG. 7 is a perspective view representing an example of a partial structure for changing the displayed position of a virtual image.

FIGS. 6 and 7 show specific structure examples to change the displayed position of a virtual image. An eccentric cam plate 162 is installed on the virtual image position adjusting knob 18 via an axle 161. The eccentric cam plate 162 is installed within the cam groove 132d of a slide plate 132. Hence, if the virtual image position adjusting knob 18 is turned in a clockwise direction or counterclockwise direction, the slide plate 132 is moved forward or rearward (in FIG. 6, the left downward or right upward direction). This movement is guided by means of a pin 104c attached onto a frame 104 inserted into elongated grooved holes 132a and 132c formed on the slide plate 132.

The LCDs 12 are held by LCD holders 124 and back light 11 and are mounted on a rear part of the slide plate 132. Therefore, since the virtual image position adjusting knob 18 is rotated, the LCDs 12 are finally moved toward the front position or toward a rear position (in FIG. 6, the left downward direction or right upper direction). That is to say, the LCDs 12 are moved toward or away from a unit main body 121 of an optical visual sensing unit 120 having the mirrors 13 and the aspherical lens 14. Thus, as shown in FIG. 3, the relative distance of the LCDs 12 to the aspherical lens 14 is changed so that the displayed position of the virtual image can be moved.

On the other hand, pin portions 124c are extended on their bottom ends of the left and right LCD holders 124, respectively. The pin portions 124c are inserted into recessed portions 163c of the cam arm 163. The respective recessed portions 163c of the cam arm 163 arranged on its left and right sides are arranged such as an inverse U shape as viewed from above. Consequently, as the left and right LCD holders 124 are moved such as to be nearer to the unit main body 121, the left and right pin portions 124c are guided so as to be moved in the inner direction (mutually nearer direction). As the result, the left and right LCD holders 124 (hence, the LCDs 12 which are held thereon) are guided by means of a shaft 136 and moved in the inner direction (mutually nearer direction) since the holder's projection 124a is inserted into the shaft 136.

On the contrary, if the virtual image position adjusting knob 18 is adjusted so that the LCD holder 124 is moved in a direction such that the LCD holders 124 are separated from the unit main body 121, the left and right LCD holder 124 (left and right LCDs 12) are moved in mutually separated directions. Consequently, the convergence angle shown in FIG. 5 can be adjusted.

Figure 8:
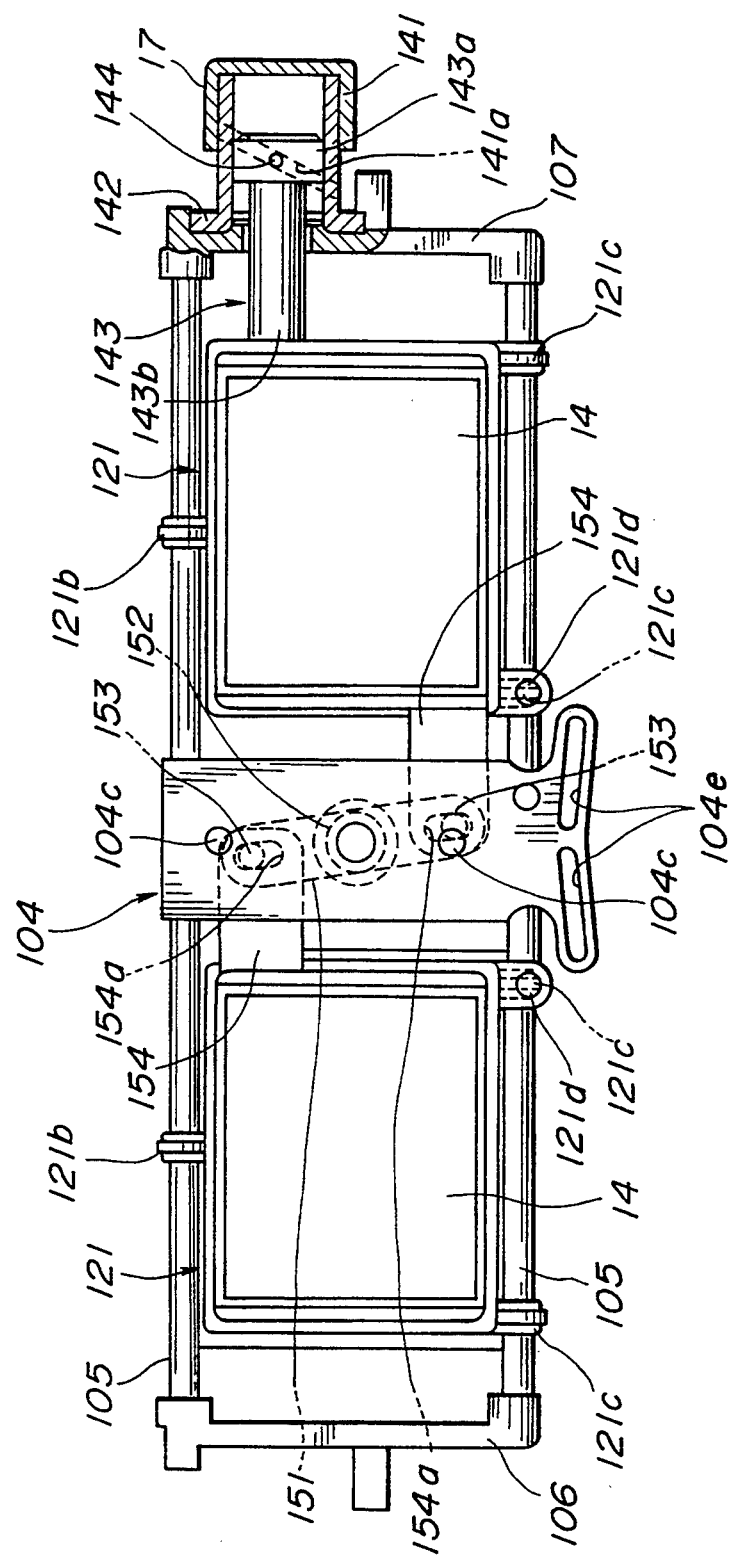
FIG. 8 is a plan view for explaining the operation of the aspherical lens when an eye-width adjusting knob explained in the description of FIG. 2 is operated.

FIG. 8 shows a specific example of the structure of the apparatus in order to adjust the relative distance between the left and right aspherical lenses 14 when the eye-width adjustment knob 17 is adjusted. As shown in FIG. 8, the eye-width adjusting knob 17 is coupled to a cylindrical cam 141. The cylindrical cam 14 is rotatably held on the holder 107 of the aspherical lenses 14 by means of a stop ring 142. An outer periphery of the cylindrical cam 141 is formed with a cam grooved hole 141a. A cam pin 144 attached onto a head portion 143a of a rod 143 is inserted into a cam grooved hole 141a. A basic end portion 143b of the rod 143 is linked to the right sided aspherical lens 14.

When the eye-width adjusting knob 17 is rotated in either the clockwise direction or the counterclockwise direction, the cylindrical cam 141 is rotated integrally so that the cam pin 144 extended on the head portion 143a of the rod 143 is guided into the cam grooved hole 141a of the cylindrical cam 141. Thus, the cam pin 144 is moved in the leftward or rightward direction correspondingly to a rotational direction of the eye-width adjusting knob 17 as shown in FIG. 8. Consequently, the right side aspherical lens 14 to which the rod is linked is moved toward the left side or right side, their holding portions 121b and 121c being guided by means of the shaft 105.

As shown in FIG. 8, arms 154 are linked to inner sides of the left and right aspherical lenses 14 and their tips are formed with elongated grooved holes 154a, respectively. Pins 153 which are attached onto both ends of a pivotal lever 151 are inserted into the respective elongated grooved holes 154a. Then, a center of the pivotal lever 151 is pivotally supported on a fulcrum axle 152. Consequently, when the right side aspherical lens 14 is moved in the leftward direction as viewed from FIG. 8, arm 154 is moved accordingly toward the leftward direction. At this time, since the pin 153 inserted into the elongated grooved hole 154a of the arm 154 is pressed toward the leftward direction in FIG. 8, the pivotal lever 151 is pivoted in the clockwise direction with the fulcrum axle 152 as a fulcrum.

As the result, one of the pins 153 which is attached onto an opposite side to the pivotal lever 151 is rotated in the clockwise direction with the fulcrum axle 152 as a center so that the arm 154 having the elongated grooved hole 154a is moved in the rightward direction. Hence, the aspherical lens 14 at the right side is guided by means of a shaft 105 via the holding portions 121b and 121c and is moved in the right direction. That is to say, the left and right aspherical lens 14 are moved so as to become nearer to each other.

When the eye-width adjusting knob 17 is rotated in the opposite direction and the rod 143 is moved in the rightward direction, the left and right aspherical lens 14 are moved in mutually separate directions.

As described above, when one of main bodies of the unit 121 housing the aspherical lens 14 are moved toward directions mutually closer to or mutually away from the other of the unit main bodies thereof, the pin portions 121d formed on the left and right unit main bodies are accordingly moved mutually closer together or mutually away from each other as well.

When the left and right pin portions 121d are moved in directions mutually approaching to each other, one of the left and right cam arms 163 through which the pin portions 121d are inserted are also moved in the mutually approached direction to the other. The left and right cam pin portions 163b respectively attached onto the left and right cam pins 163b are moved in directions mutually approached directions.

These left and right cam pin portions 163b are inserted into the left and right cam grooved holes 104e which are formed on the frame 104 in an inverted U shape. Consequently, when the left and right cam pin portions 163b are moved in directions mutually approaching directions, a cam arm 163 shown at a right side of FIG. 7 is pivoted in the counterclockwise direction as the pin portion 121d as a center. A cam arm 163 shown at the right side of FIG. 7 is pivoted in the clockwise direction. As described above, pin portions 124c of the LCD holders 124 are inserted into recessed portions 163c of the cam arms 163 so that the left and right LCD holders 124 are moved accordingly in directions such that they are closer together (so that the convergence angle becomes wider).

On the contrary, when the left and right aspherical lens 14 are moved in directions mutually separating, the left and right cam arms 163 are pivoted in the clockwise direction or counterclockwise direction with the pin portions 121d as a center, respectively, the left and right LCDs 12 are moved in directions mutually separating from each other, That is to say, they are adjusted so that the convergence angle becomes narrower.

As described above, with the eye-width adjusted, the relative distance between the aspherical lens 14 is not only adjusted but only the relative distance between the LCDs 12 is automatically adjusted so that the convergence angle can accordingly be adjusted.

Figure 9:
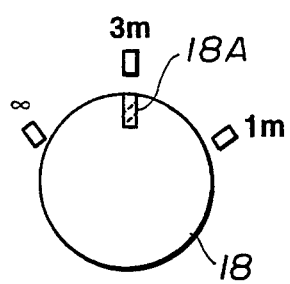
FIG. 9 depicts an example of a virtual image position adjusting knob.

FIG. 9 shows an example of the virtual image position adjusting knob 18 having a mark 18A. In this embodiment, symbols representing the position of the virtual image (symbols such as 1 m, 3 m, and ∞) are located around the virtual image position adjusting knob 18. The user can adjust the position of the virtual image by rotating the adjusting knob 18 so that the mark 18A is aligned with a desired symbol. Consequently, the position of the virtual image can be adjusted.

That is to say, for example, if the mark 18A of the virtual image position adjusting knob 18 is aligned with the position on which the symbol of 1 m is displayed, the position of the LCDs 12 is adjusted so that the displayed position of the virtual image indicates 1 m. If the mark 18A is made coincident to the position of the symbol 3 m or symbol ∞, the position of the LCDs 12 is adjusted so that the virtual image displayed position indicates the position denoted by 3 m or by ∞.

Figure 10:
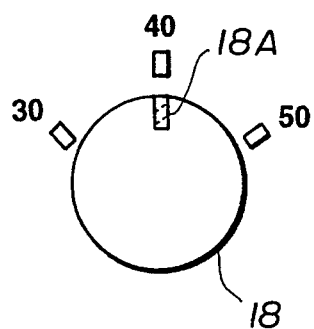
FIG. 10 depicts another example of the virtual image position adjusting knob.

FIG. 10 shows another example of the virtual image position adjusting knob 18. In this embodiment, i.e., the position of the virtual image is not indicated in such direct distances as 1m, 3m, and ∞ but indicated in the form of a magnitude of the image screen such as 50 inches, 40 inches, and 30 inches. In the latter case, the LCDs 12 are moved to a position at which the image screen of 50 inches can be observed by the user when, for example, the mark 18A of the virtual image position adjusting knob 18 is adjusted at a position of the symbol of 50 inches. If the mark 18A is adjusted to the symbol of 40 inches or 30 inches, the LCDs 12 are moved to a position equivalent to a case where the user views the image screen having the magnitude of 40 inches or 30 inches.

Figure 11A:
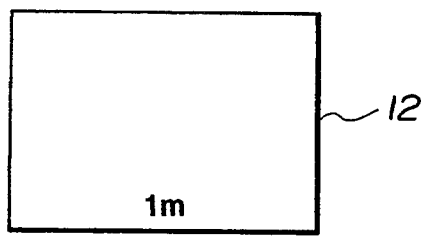
FIGS. 11 (a)-(c) depict displays of virtual image positions in accordance with the present invention.
Figure 11B:
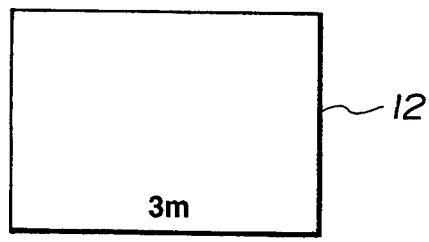
Figure 11C:
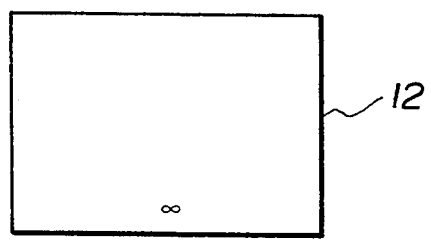

It is also possible for these virtual image displayed positions to be displayed on the LCDs 12, as shown, for example, in FIGS. 11 (a)-(c) and 12 (a)-(c). In the embodiment shown in FIGS. 11 (a)-(c), the symbols such as 1m, 3m, and ∞ in FIG. 9 are directly displayed on the LCDs 12 as shown in FIGS. 11 (a) through 11 (c) so as to correspond to the rotated position of the virtual image position adjusting knob 18.

Figure 12A:
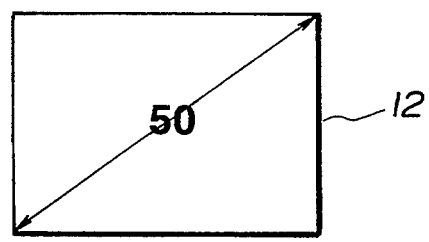
FIGS. 12 (a)-(c) depict alternate displays of virtual image positions in accordance with the present invention.
Figure 12B:
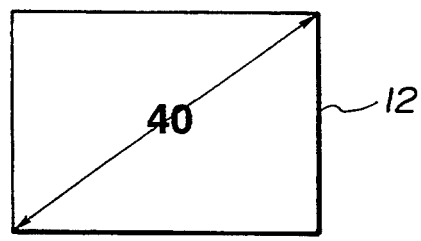
Figure 12C:
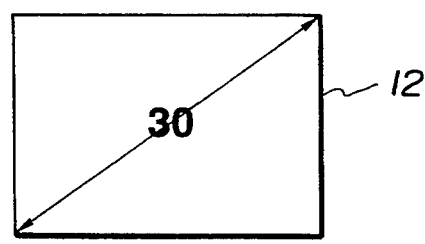

In addition, in the embodiment shown in FIGS. 12 (a)-(c), numerals 50, 40, 30, and so forth each of which represent the magnitude of the image screen shown in FIG. 10 are displayed on the LCDs 12. In this embodiment, in order for the user to recognize that these numerals represent the magnitude of the image screen, a straight line with an arrow mark at both ends of the line is simultaneously displayed in a diagonal position on the image screen. If the user rotates the virtual image position adjusting knob 18, indications such as shown in FIGS. 12 (a) through 12 (c) are consequently displayed on the LCDs 12 corresponding to the rotated position of the knob.

FIGS. 13 through 17 show embodiments for processing steps which occur in regard to the position of the virtual image.

Figure 13:
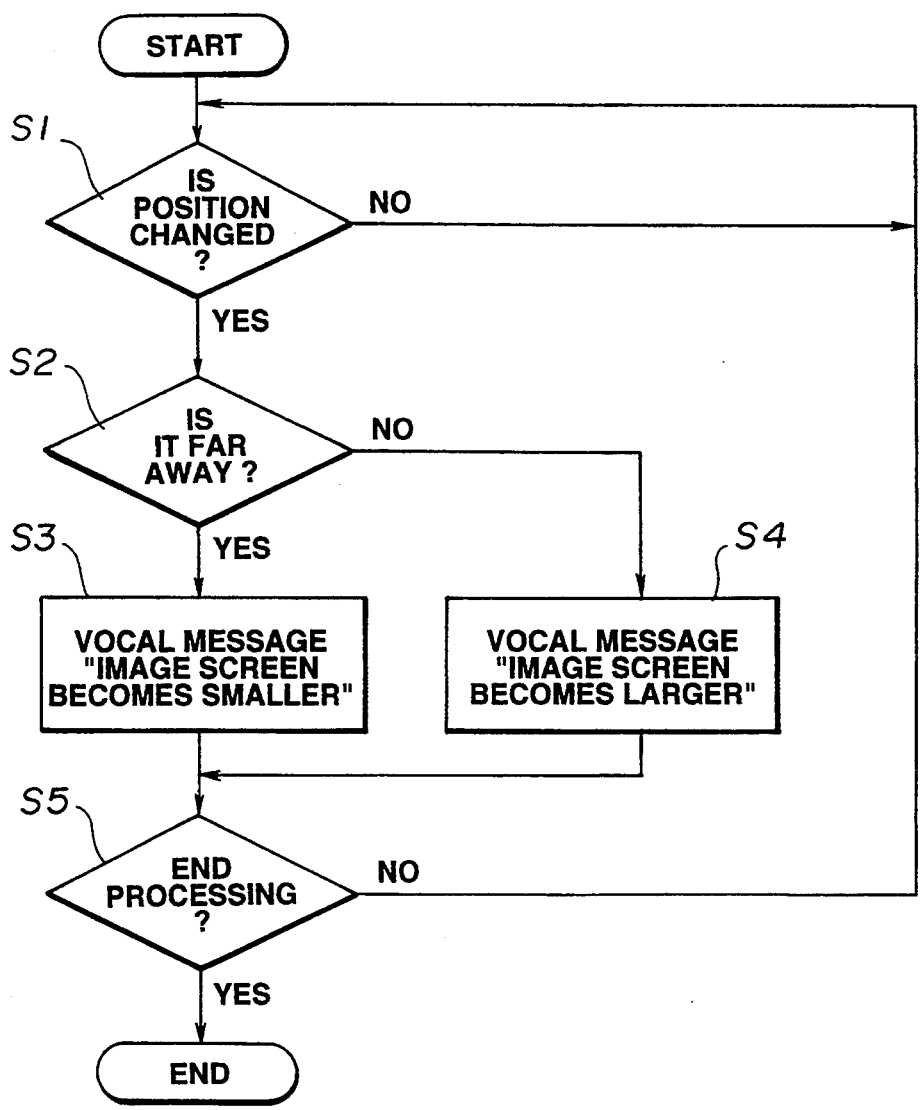
FIG. 13 is a flowchart for explaining processing steps which occur when the virtual image position adjusting knob is operated.

In the embodiment of FIG. 13, a CPU of the microcomputer of the control unit determines, at a step S1, whether a change in the displayed position of the virtual image is indicated. That is to say, the control unit 51 serves to monitor whether the virtual image position adjusting knob 18 has been operated. When the virtual image position adjusting knob 18 is operated, the routine goes from the step S1 to the step S2. At step S2, the CPU of the control unit determines whether the operation of the virtual image position adjusting knob 18 is carried out so as to direct the position of the virtual image far away from or nearer to the present position.

In a case where the virtual image position adjusting knob 18 is operated in the direction far away from the present position at the step S2, the routine goes to a step S3 in which a predetermined speech message is output. That is to say, at this step, the control unit 51 controls the second acoustic generating unit 64 to generate, for example, messages such as "the image screen becomes smaller", "displayed position becomes far away", or other similar messages. Such vocal messages as described above are output to the ear phone 31 via the first synthesize circuit 65 and D/A converter 66.

On the other hand, if at the step S2 the CPU determines that the virtual image position adjusting knob 18 is operated so that the virtual image is moved toward the present position, the routine goes to a step S4 in which another vocal message corresponding to this operation is generated. For example, the control unit 51 ultimately causes the generation of vocal messages such as "the image screen becomes larger", "the displayed position becomes closer" which are then output to the ear phone 31.

In this way, vocal messages for alerting the user to pay more careful attention to the position of the virtual image (magnitude of the image screen) are heard by the user. Hence, for example, in a case where long term use with the displayed position of the virtual image near thereto (with the large image screen) is performed, and if an operation manual previously describes that undesirable minor discomforts may occur, each vocal message for each change in the virtual image displayed position is output so that the user can be more frequently alerted to the possibility of the occurrence of a minor discomfort.

After either step S3 or step S4 where the predetermined message is output, the routine goes to step S5 where it is determined whether further processing is desired. If no instruction to end processing is input, the routine returns to the step S1 and processing is executed repeatedly.

Figure 14:
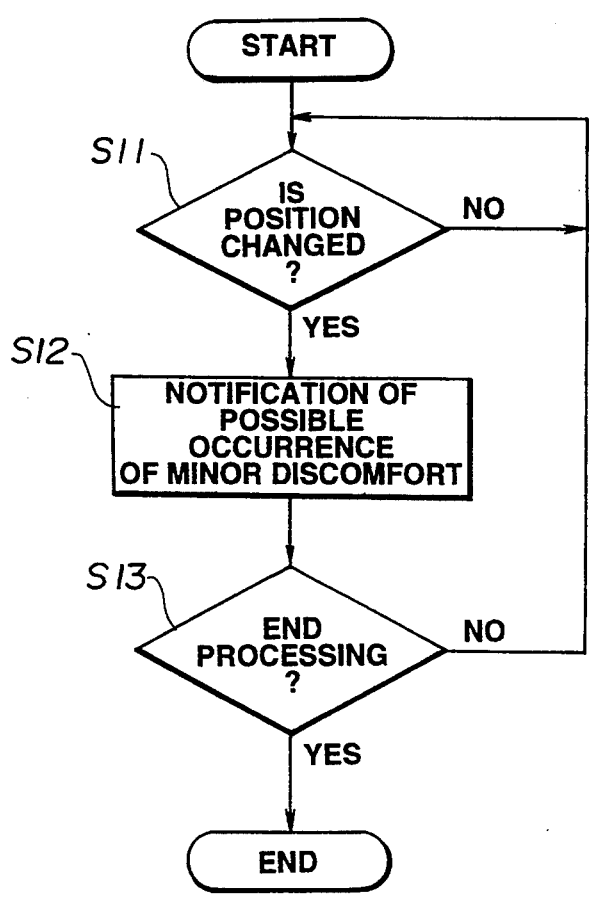
FIG. 14 is a flowchart for explaining an alternate embodiment for the processing steps which occur when the virtual image position adjusting knob is operated.

On the other hand, in the embodiment of FIG. 14, at a step S11, the CPU determines whether the displayed position of the virtual image is changed. If the CPU determines that the displayed position of the virtual image is changed, the routine goes to a step S12 wherein a message is issued which notifies the user of the possibility that a minor discomfort may occur. That is to say, at step S12, the control unit 51 controls the second acoustic generating unit 64 so that the vocal message is generated, for example, such as a vocal message indicating that long term use may cause a minor discomfort to occur. This vocal message is output to the earphone 31 via first the synthesize circuit 65 and D/A converter 66.

In addition, the message generating unit 76 is controlled so that a similar message is generated in the form of characters. These characters are displayed on the LCDs 12 via the fourth synthesize circuit 85. It noted that either the vocal warning message or the video warning message may be selected and generated.

In this way, a direct notification of the possibility that a minor discomfort may occur is not merely an indirect message but rather is in the form of either an audio or video message to ensure that the message is received and recognized by the user.

The above-described processing is executed repeatedly at step S13 until instructions for ending further processing are given.

It is noted that although, in the embodiment of FIG. 14, at step S11 the CPU determines whether the displayed position of the virtual image is changed, it is also possible to determine whether a predetermined time has elapsed upon the start of use of the eyeglass display 86. In this manner, it is possible to notify the user to the possibility that a minor discomfort may occur whenever a predetermined time period has passed. In particular, it has been found that when used for a two hour time period at a convergence angle of approximately 30, there is a substantially reduced possibility of the occurrence of a minor discomfort.

Figure 15:
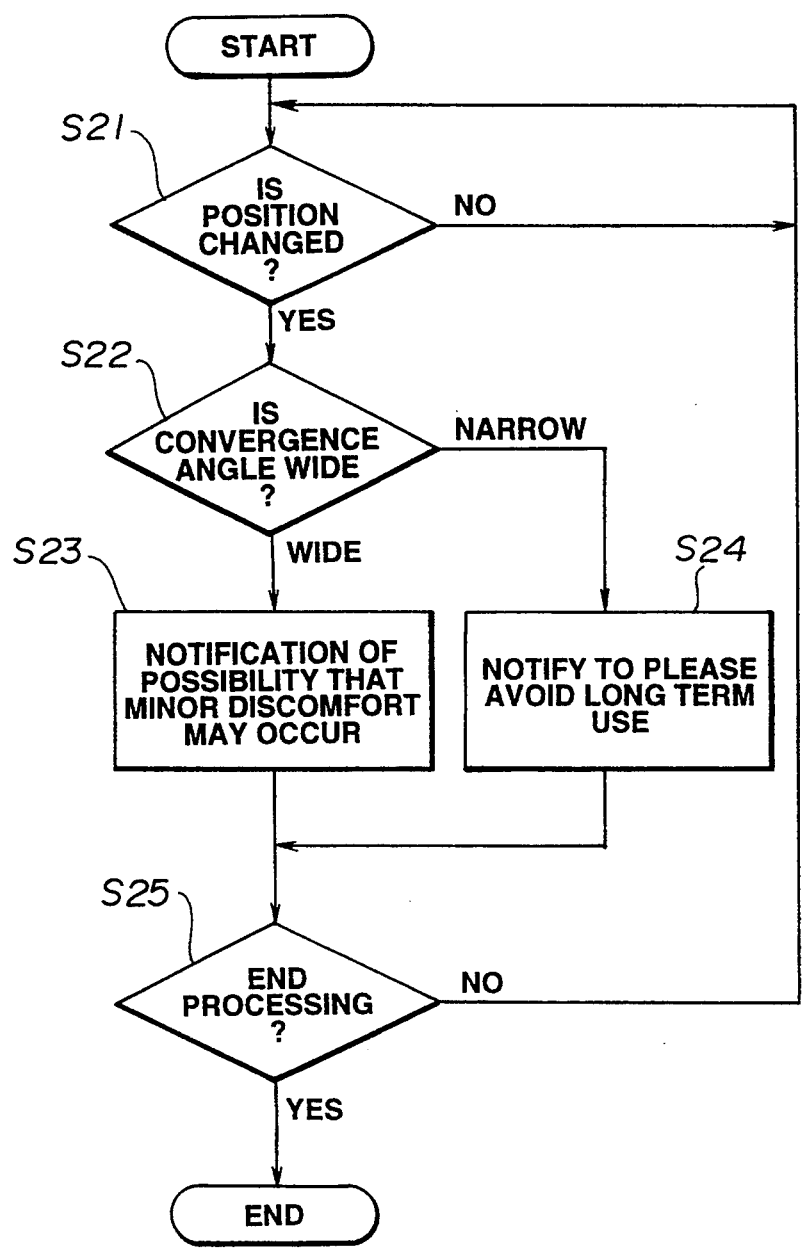
FIG. 15 is a flowchart for explaining a further alternate embodiment for the processing steps which occur when the virtual image position adjusting knob is operated.

In the embodiment of FIG. 15, at a step S21, the CPU waits for the instruction to change the displayed position of the virtual image. If the instruction to change the displayed position of the virtual image is issued, the routine goes to a step S22 in which the CPU determines whether this change in the displayed position is such a change that the convergence angle is directed to become wider or to become narrower. If the change is such that the convergence angle becomes wider, the routine goes to step S23 in which a predetermined notification of the possibility that a minor discomfort may occur is issued. For example, a warning that long term use might cause the occurrence of a minor discomfort may be output to either the ear phone 31 or the LCDs 12.

In addition, if, at step S22, the CPU determines whether the change is such a change that the convergence angle becomes narrower, the routine goes to a step S24 in which a different notification from that in the step S23 is generated. For example, a warning such as "please avoid long term use if possible" may be output to either the ear phone 31 or LCDs 12.

In this way, since different notifications are generated depending upon whether the convergence angle becomes wider (the displayed position of the virtual image becomes closer, i.e., the magnitude of the image screen is made larger) or the case where the convergence angle becomes narrower (the displayed position of the virtual image becomes further away, i.e., the magnitude of the image screen is made smaller), it is possible to generate notifications as needed.

The above-described processing are executed at the step S25 until a processing end instruction is issued.

Figure 16:
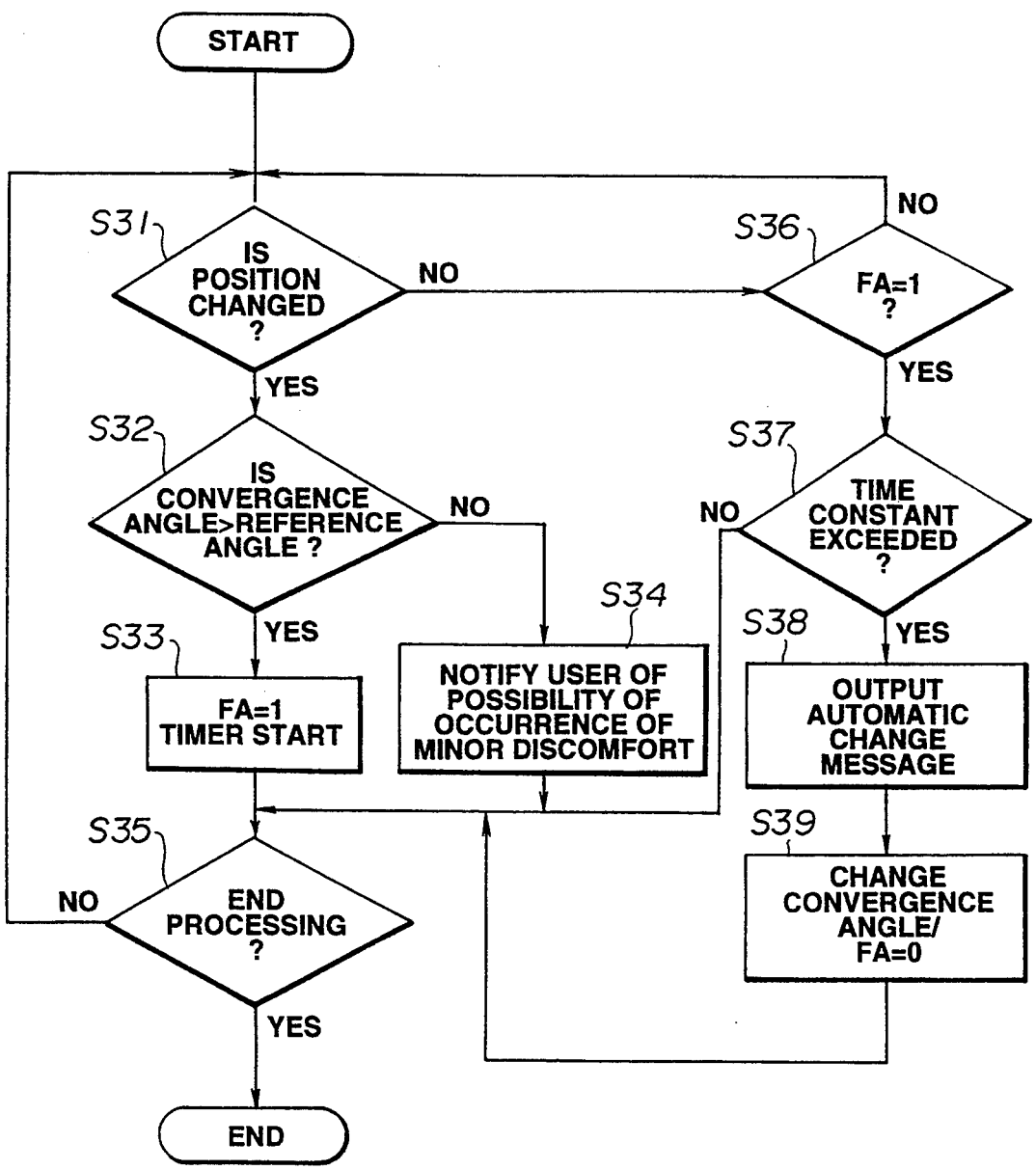
FIG. 16 is a flowchart for explaining a still further alternate embodiment for the processing steps which occur when the virtual image position adjusting knob is operated.

FIG. 16 shows a further embodiment of the present invention. In this embodiment, at step S31, the CPU determines whether the displayed position of the virtual image is changed. If the displayed position of the virtual image is changed due to the operation of the virtual displayed position adjusting knob 18, the routine goes from step S31 to step S32 in which the CPU determines whether this change makes the convergence angle wider or narrower than a predetermined reference angle value. If the convergence angle is wider than the predetermined reference value, the routine advances a step S33 in which a flag FA is set to 1 and a timer built in the control unit 51 is actuated. Thereafter, the routine returns from step S35 to step S31 in which the CPU again determines whether a change in the displayed position of the virtual image occurs.

If the adjustment operation of the virtual image displayed position adjusting knob 18 is ended, the routine goes to step S36 since the CPU determines, at the step S31, that no change in the displayed position of the virtual image occurs. At step S36, the CPU determines whether the flag FA is set to 1. In this case, at step S33, the CPU determines that the flag FA is set to 1. Hence, in this case, the routine goes to step S37 in which the CPU determines whether the timer started at the step S33 has indicated a predetermined constant time.

If the timer, at step S37, has determined that it is not yet passed the set time previously set by the timer, the routine returns to step S35 at which point it is determined whether a processing end has been instructed. If the end of processing has not yet been instructed, the routine again returns to step S31 and the same processing is repeated.

That is to say, when the virtual image position adjusting knob 18 is adjusted so that the convergence angle becomes wider than the predetermined value, the series of processing at steps of S31, S36, S37, and S35 are executed repeatedly. Then, when the predetermined set time has passed, the routine goes from step S37 to step S38 in which an automatic change message is output. For example, such a message as "the virtual image displayed position is made far way" is output to at least either of the ear phone 31 and the LCDs 12.

Furthermore, the routine goes to a step S39 in which flag FA is reset and the LCDs 12 are forcefully (automatically) moved so that the virtual image position becomes further from the reference value so that the convergence angle becomes narrower than the reference value. That is to say, at this time, the control unit 51 drives a motor 56 included in the eyeglass display 86 to automatically move the LCDs 12 to a predetermined position. Consequently, in a case where the virtual image displayed position is nearer to the reference value (in a case where the convergence angle is wider than the previously set reference value), the term of use at the displayed position of the virtual image is limited within the previously set constant time. If more time is used than the set time, the displayed position of the virtual image is automatically moved toward a far-away position. Hence, the possibility of an occurrence of a minor discomfort is substantially reduced or eliminated.

The routine then advances from step S39 to step S35 and returns again to step S31 if no instruction to end the processing is issued. Thereafter, the series of processing is executed repeatedly.

In a case where the CPU determines that the convergence angle does not exceed the reference value at the step S32, the routine goes from step S32 to step S34 in which the user is notified of the possibility of the occurrence of a minor discomfort. That is to say, a message such as "long term use might generate a minor discomfort" is output. Then, at step S35, if the end of processing instruction is not given, the routine again returns to step S31 and the same series of processing is executed repeatedly.

If the virtual image position adjusting knob 18 is not operated, the routine goes from step S31 to step S36. Since the flag FA is now reset, the routine again returns to the step S31. Thereafter, the series of processing steps are executed repeatedly.

Figure 17:
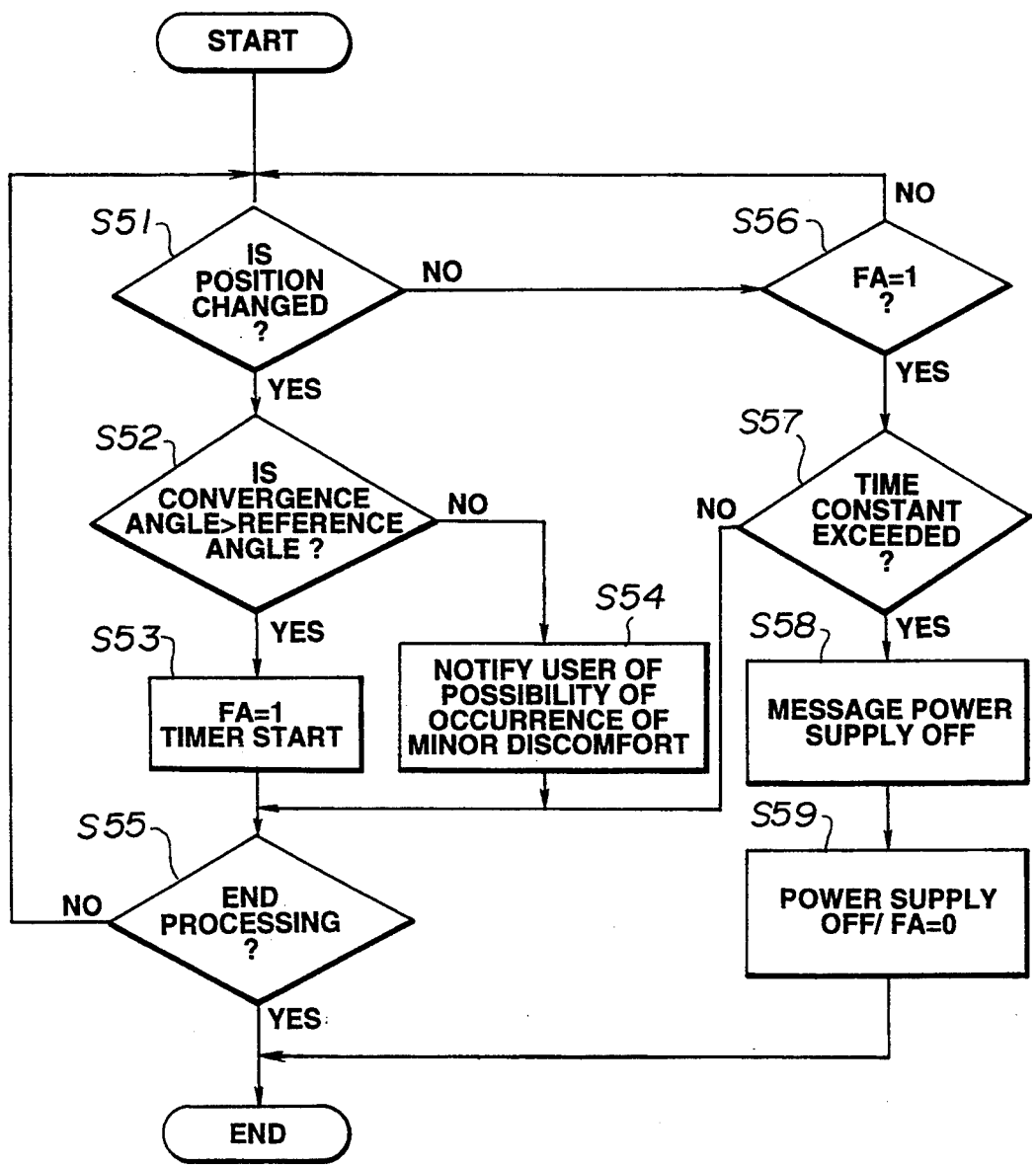
FIG. 17 is a flowchart for explaining an additional embodiment for the processing steps which occur when the virtual image position adjusting knob is operated.

FIG. 17 shows a still further embodiment. In this embodiment, the same series of processing steps are executed as steps of S31 through S37 in FIG. 16, except that the processing at steps S58 and S59 is different from the processing at steps S38 and S39 in FIG. 16, respectively.

That is to say, in the embodiment of FIG. 16, when the previously set time has passed after a change is made such that the convergence angle exceeds the reference value, the predetermined message is output so that the displayed state is automatically changed to reduce the convergence angle. However, in the embodiment of FIG. 17, at step S58, such a message as "since the predetermined constant time has passed, the power supply is turned off" is output to the ear phone 31 and LCDs 12 in place of the change in the displayed state so as to reduce the convergence angle. In addition, at step S59, the power supply is automatically turned off and the display is halted and the flag FA is reset. In this way, the possibility of an occurrence of a minor discomfort may be reduced or eliminated.

What is claimed is:

1. An image display apparatus comprising:
    image displaying means for displaying an image,
    optical means for optically generating a virtual image of the image displayed through said image displaying means;
    adjusting means for adjusting a position of said virtual image; and
    position displaying means for displaying a position of said virtual image, wherein said position displaying means displays the position of said virtual image as a magnitude of an image screen corresponding to said virtual image.

2. An image display apparatus according to claim 1, further comprising information means for informing a user in speech form of a change in the position of said virtual image position when said adjusting means adjusts the position of said virtual image.

3. An image display apparatus according to claim 2, further comprising notification means for displaying information corresponding to the position of said virtual image.

4. An image display apparatus according to claim 3, further comprising first controlling means for controlling a power supply according to the position of said virtual image and its displayed time duration.

5. An image display apparatus according to claim 4, which further comprises second controlling means for automatically controlling the position of said virtual image corresponding to the position of said virtual image and its displayed time duration.

6. An image display apparatus according to claim 1, further comprising information means for informing a user in speech form of a change in the position of said virtual image position when said adjusting means adjusts the position of said virtual image.

7. An image display apparatus according to claim 1, further comprising notification means for displaying information corresponding to the position of said virtual image.

8. An image display apparatus according to claim 1, further comprising first controlling means for controlling a power supply according to the position of said virtual image and its displayed time duration.

9. An image display apparatus according to claim 1, which further comprises second controlling means for automatically controlling the position of said virtual image corresponding to the position of said virtual image and its displayed time duration.

10. An image display apparatus as set forth in claim 1, wherein said position displaying means is installed adjacent to said adjusting means.

11. An image display apparatus according to claim 10, further comprising information means for informing a user in speech form of a change in the position of said virtual image position when said adjusting means adjusts the position of said virtual image.

12. An image display apparatus according to claim 11, further comprising notification means for displaying information corresponding to the position of said virtual image.

13. An image display apparatus according to claim 12, further comprising first controlling means for controlling a power supply according to the position of said virtual image and its displayed time duration.

14. An image display apparatus according to claim 13, which further comprises second controlling means for automatically controlling the position of said virtual image corresponding to the position of said virtual image and its displayed time duration.

15. An image display apparatus according to claim 10, further comprising information means for informing a user in speech form of a change in the position of said virtual image position when said adjusting means adjusts the position of said virtual image.

16. An image display apparatus according to claim 10, further comprising notification means for displaying information corresponding to the position of said virtual image.

17. An image display apparatus according to claim 10, further comprising first controlling means for controlling a power supply according to the position of said virtual image and its displayed time duration.

18. An image display apparatus according to claim 10, which further comprises second controlling means for automatically controlling the position of said virtual image corresponding to the position of said virtual image and its displayed time duration.

19. An image display apparatus as set forth in claim 1, wherein said position displaying means is installed onto said adjusting means.

20. An image display apparatus according to claim 19, further comprising information means for informing a user in speech form of a change in the position of said virtual image position when said adjusting means adjusts the position of said virtual image.

21. An image display apparatus according to claim 20, further comprising notification means for displaying information corresponding to the position of said virtual image.

22. An image display apparatus according to claim 21, further comprising first controlling means for controlling a power supply according to the position of said virtual image and its displayed time duration.

23. An image display apparatus according to claim 22, which further comprises second controlling means for automatically controlling the position of said virtual image corresponding to the position of said virtual image and its displayed time duration.

24. An image display apparatus according to claim 19, further comprising information means for informing a user in speech form of a change in the position of said virtual image position when said adjusting means adjusts the position of said virtual image.

25. An image display apparatus according to claim 19, further comprising notification means for displaying information corresponding to the position of said virtual image.

26. An image display apparatus according to claim 19, further comprising first controlling means for controlling a power supply according to the position of said virtual image and its displayed time duration.

27. An image display apparatus according to claim 19, which further comprises second controlling means for automatically controlling the position of said virtual image corresponding to the position of said virtual image and its displayed time duration.

* * * * *